June 2, 1953    N. LANGER    2,640,796
METHOD OF BONDING
Filed March 26, 1952
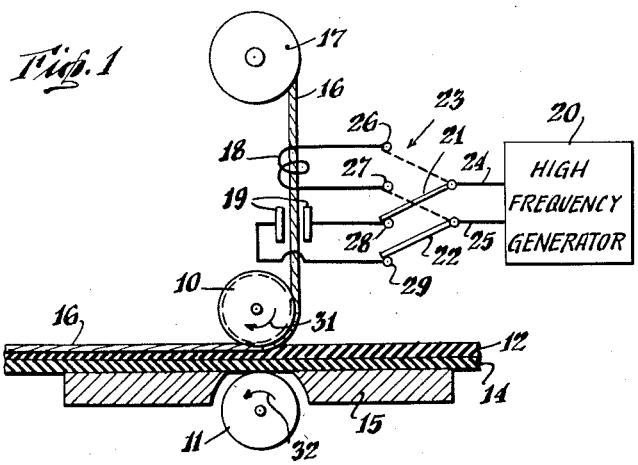
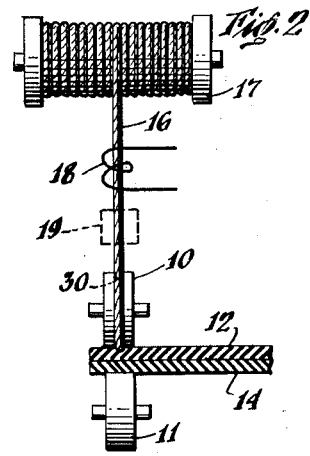
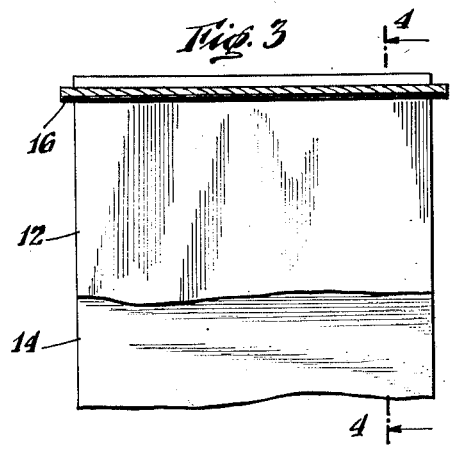
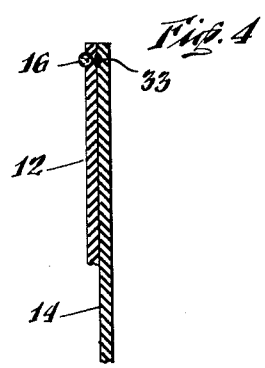
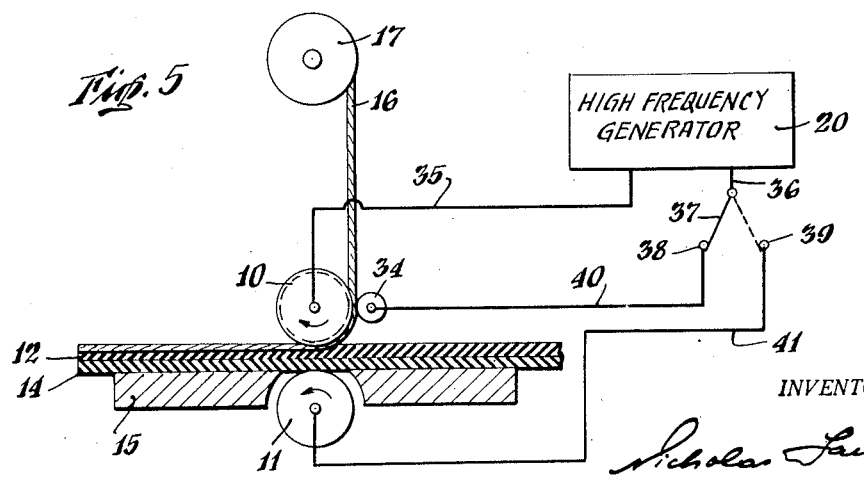
INVENTOR.
Nicholas Langer Patented June 2, 1953

2,640,796

UNITED STATES PATENT OFFICE 2,640,796

METHOD OF BONDING

Nicholas Langer, New York, N. Y.

Application March 26, 1952, Serial No. 278,570

11 Claims. (Cl. 154—90)

This invention relates to machines and methods for bonding or sealing together a plurality of plies or layers of thermoplastic sheet material. The present application is a continuation-in-part of my co-pending application Serial No. 212,380, filed February 27, 1951.

In recent years various bonding machines have been introduced for bonding together plies of thermoplastic material by localized heating of the material through the space between a pair of electrodes connected to a source of radio frequency energy, the displacement of such plies being effected in a step-by-step or discontinuous manner, such as in a conventional sewing machine, or in a continuous manner, such as by means of a pair of feed rolls. The powerful high frequency field produced in the electrode zone will heat up the plies of the material passing therethrough to their bonding temperature, causing sealing or bonding of such plies as a result of the joint effect of heat and electrode pressure.

While electrostatic bonding machines of the described character, sometimes referred to as "electronic sewing machines," have been used in the industry for some years on a rather limited scale, their use on a large scale in the quantity production of articles formed from thermoplastic sheet materials was seriously handicapped and in many cases was completely prevented by a combination of the following factors:

(1) The operation of conventional electronic sewing machines is based on the heat produced in the material as a result of dielectric losses in a high frequency field. This introduces certain limitations as to the types of thermoplastic materials which may be successfully bonded and obviously excludes such materials in which the dielectric losses are very low. It so happens that there are various materials, such as particularly polyethylene, which are characterized by an extremely low loss factor, although they are quite desirable for other reasons, such as low cost, high strength, chemical inertness, low gas permeability, and the like.

(2) In view of the extremely high frequencies used in conventional electronic bonding machines, serious problems are introduced in connection with impedance matching, in controlling the amount of heat generated in the plies, etc. Even very minute and frequently unavoidable variations in the composition and thickness of the plies or in the rate at which the plies are fed past the bonding electrodes may prevent the production of uniformly sound seals or bonds. The adjustment of electrode spacing is quite critical and even with the most careful adjustment it is next to impossible to bond very thin layers or plies which are frequently overheated or burned rather than properly sealed.

(3) The amount of high frequency energy required is quite considerable and the equipment for generating such energy is bulky and also expensive both to build and to operate. As a result, the initial cost of these electronic bonding machines is quite high and their commercial use is profitable only in extreme cases where no other method of heat sealing or bonding will serve.

I have discovered that the outstanding problem may be solved and the foregoing disadvantages may be eliminated in a remarkably simple manner.

It is an object of the present invention to improve electronic bonding machines.

It is another object of the present invention to provide a novel and improved electronic bonding machine and method.

It is a further object of the present invention to provide a novel machine and method for bonding together plies of thermoplastic sheet material in which a progressively displaced filamentary member is combined with linear regions of the plies to cause transfer of sealing heat thereto and permanent bonding of the plies in corresponding regions.

It is also within the contemplation of the invention to provide an electronic bonding machine which requires only very small amounts of high frequency energy for its satisfactory operation.

The invention also contemplates an electronic bonding machine which is simple and inexpensive to construct and to operate and which may be manufactured and sold at a fraction of the cost of conventional electronic bonding machines.

Other and further objects and advantages of the invention will become apparent from the following description, taken in conjunction with the accompanying drawing, in which:

Figure 1 is a side elevation, somewhat diagrammatic and fragmentary in character and having parts in section, of an electronic bonding machine embodying the principles of the present invention;

Figure 2 is a front view of a portion of the machine shown in Figure 1;

Figure 3 is a fragmentary top plan view of two layers of thermoplastic sheet material bonded together in accordance with my present invention;

Figure 4 is a section taken on line 4—4 of Figure 3; and

Figure 5 is a view similar to Figure 1, also diagrammatic and fragmentary in character, of a modified embodiment of the present invention.

Broadly considered, in accordance with the principles of my invention, the layers or plies of thermoplastic sheet material to be bonded together are brought into contact with a filamentary member, such as a filament, thread, wire, strip or narrow band, which is preheated to a temperature at least equaling but preferably somewhat exceeding the bonding temperature of the layers. The structure constituted by said layers and said filamentary member is then passed through a pressure zone wherein a limited length of the structure is placed under compression. This compression and the intimate contact and heat exchange relation between the preheated filamentary member and the underlying layers will cause the transfer of bonding heat from the said member onto the said layers. The combined effect of heat and pressure in the pressure zone will cause heat sealing or bonding of the layers in a corresponding linear region, at the same time partially or fully embedding the filamentary member in the bonded region, thereby producing a "stitch." Further portions or lengths of the thermoplastic layers with the superposed preheated filamentary member are advanced into the pressure or bonding zone in a continuous or discontinuous manner and the procedure is repeated to progressively form a series of closely spaced or continuously merging "stitches" in the layers.

Preheating of the filamentary member is accomplished by passing the same through a heating zone wherein the said member is exposed to the effect of suitable heating means. These heating means may be of a greatly different character in accordance with the material of the filamentary member and the specific requirements of the particular machine. For example, good results may be obtained by radiant heating means to which the filamentary member is exposed or by hot gases impinged against the member. It is preferred, however, to utilize a high frequency electrostatic or electromagnetic field through which the filamentary member is passed immediately before it is combined with the layers of thermoplastic material. It is also possible and is in some cases advantageous to combine the preheating and the pressure-applying or bonding zone into a common zone in which both the preheating as well as the bonding will take place whereby the heat losses in the interval that will elapse before the bonding heat stored in the filamentary member is transferred to the layers to be bonded together are substantially completely eliminated.

Referring now more particularly to Figures 1 and 2 of the drawing, reference numerals 10 and 11 denote a pair of rotatable pressure rolls or wheels between which the layers of thermoplastic material 12 and 14 may be advanced with the assistance of a feed table 15. A filament 16 of a suitable material is unwound from a spool or roll 17 and is guided around the lower circumferential surface of roll 10 to be deposited onto the upper surface of layers 12 and 14. Between spool 17 and upper pressure roll 10, the length of the filament is exposed to the heating effect of a high frequency field, such field being produced in the axial space of a coil 18 of a few turns or in the space between a pair of electrodes 19. Coil 18 or electrodes 19 are energized with high frequency energy from a generator 20. The output of generator 20 is connected to the switching arms 21 and 22 of a double pole-double throw switch 23 by conductors 24 and 25 respectively. The working contacts of the said switch 26, 27 and 28, 29 are connected to the respective ends of coil 18 and electrodes 19. Thus, it will be noted that by manipulating switch 23, either coil 18 or electrodes 19 will be energized by the output of generator 20. In general, where the filamentary member is formed of an electrically conducting material, it is preferred to employ the heating effect of the high frequency electromagnetic field in the axial space of coil 18, while the heating effect of the high frequency electrostatic field between electrodes 19 is relied upon for preheating the filamentary member 16 when the said member is formed of a non-conducting or dielectric material. As it will be best observed in Fig. 2, a shallow groove 30 is provided in the circumferential surface of roll 10 in order to assure more positive guiding of the filamentary member around the said roll.

From the foregoing description, the operation of the machine of the invention will be readily understood by those skilled in the art. When it is desired to operate the machine, the leading edge of layers 12, 14, together with the free end of filament 16 is introduced into the bight of rolls 10 and 11 and the said rolls are rotated in the direction of arrows 31 and 32 by means of any suitable driving mechanism (not shown). Switch 23 is placed into its upper or lower position in accordance with the circumstance whether the heating effect of an electromagnetic or of an electrostatic high frequency field will be relied upon, this being, of course, largely determined by the material of the filament.

During the operation of the machine, the filament 16 is being continuously drawn from spool 17 through heating zones or stations represented by coil 18 or electrodes 19 whereby successive lengths of such filaments are progressively preheated at least to the bonding temperature of layers 12 and 14. These preheated portions of the filament are then pressed against the underlying region of layers 12 and 14 by means of pressure rolls 10 and 11 whereby the bonding heat stored in the filament is transferred onto such region, causing permanent bonding thereof in a corresponding linear region by the combined effect of heat and pressure thereon. The heating effect of the high frequency heating means, (coil 18 or electrodes 19), is so correlated to the speed of advancing the layers through the rolls 10 and 11 that even after the unavoidable heat losses caused by the period elapsing between the preheating step and the pressing step, still sufficient heat remains in the filament to produce a satisfactory bond. In general, this requires preheating the filament to a temperature which at least equals but in most cases substantially exceeds the actual bonding temperature of the layers.

Figs. 3 and 4 illustrate the appearance of the bonded product of the machine shown in Figs. 1 and 2. It will be noted that the product comprises a pair of layers 12 and 14 of thermoplastic material which are fused together in their interface along a linear region 33, corresponding to the region directly underlying filament 16. The said filament is partially or fully embedded into one or both of the said layers and in most cases is likewise permanently secured and is made integral with the bonded product. It is entirely feasible, however, to carry out the method of the invention in such a manner as to have the filament embedded into the bonded product only to a very slight extent so that it can be readily stripped from the bonded layers after the bonding operation has been completed. In this case, the filament merely serves for transferring the bonding heat from the heating zone onto the regions to be bonded and is discarded after the bonding operation which may provide special advantages in certain practical applications of the invention.

Great variations are possible in the material of the filamentary member 16. If an electrically conducting member is desired, one which is preferably preheated by means of a high frequency electromagnetic field, this member may be in the form of a thin, highly flexible metal wire or band having at least fair mechanical strength, such as copper, aluminum, steel or iron wire, strip, or band. Other materials suitable for the purposes of the present invention are synthetic filaments of an electrically conducting character, such as filaments extruded from cellulose derivatives, rubber hydrochloride, vinyl resins, vinylidene chloride, or polyethylene. These materials, which are normally good dielectrics, are rendered electrically conducting by the incorporation of suitable proportions of carbon or graphite particles or of finely divided metal powders. A satisfactory and very inexpensive electrically conducting filament is provided by a conventional sewing thread of textile fibres which is impregnated or coated with carbonaceous material. While threads of this type are not readily obtainable in commerce at the present time, they are easily produced, for example, by passing a conventional sewing thread through a colloidal graphite solution, such as the colloidal graphite preparation known under the name "Aquadag," or by impregnating or coating the thread with such preparation in some other suitable manner.

If an electrically non-conducting or dielectric filamentary member is desired, one which is preferably preheated by means of a high frequency electrostatic field, this member may be in the form of a thin and flexible filament, thread, band or narrow strip of a suitable plastic, advantageously one in which the dielectric losses are relatively high. Examples of such plastics are various cellulose derivatives, vinyl resins, vinylidene chloride, and the like. If the plastic is of such character as to have an undesirably low loss factor, such loss factor may conveniently be increased to the exact value desired by the incorporation of conducting particles. In most cases such conducting particles are incorporated in amounts sufficient to increase the loss factor to the desired extent but insufficient to render the filament actually conducting. Conventional sewing thread is also useful for the purposes of electrostatic preheating as the natural moisture content thereof is generally sufficient to cause its heating to the desired bonding temperatures without requiring any special impregnating or coating treatment. Generally speaking, the material of the filament is so selected as to have a melting or softening point which is considerably higher than that of the thermoplastic layers to be bonded in order to prevent excessive weakening thereof during the preheating step.

Figure 5 illustrates diagrammatically a modified bonding machine embodying the invention which is in many respects similar to the machine described in connection with Figures 1 and 2 but has the advantage of bringing the preheating zone closer to the pressure applying or bonding zone. In this figure, similar reference numerals have been used to denote corresponding parts that are present in the machine of Figures 1 and 2.

Referring now to Figure 5, a filament 16 of dielectric material is unwound from roll or spool 17 and is passed around pressure roll 10 cooperating with another pressure roll 11. Layers 12 and 14 of thermoplastic material are fed into the bight of rolls 10 and 11 along feed table 15 and are brought into contacting position with the superimposed filament 16. An electrode roll 34 is pressed against the circumferential surface of roll 10, into contact with filament 16 wound therearound. A source of high frequency energy 20 has one of its output terminals connected to roll 10 through a conductor 35, while the other output terminal of said source is connected through a conductor 36 to a switching arm 37 of a switch having operating contacts 38 and 39. Contacts 38 and 39 are connected to rolls 34 and 11 by means of conductors 40 and 41, respectively. It will be noted that a high frequency electrostatic field will be established between rolls 10 and 34, or between rolls 10 and 11, respectively, in accordance with the position of switch 37.

In view of the similarity of construction, the operation of this modified embodiment of the invention will be readily understood without any detailed description. It will be sufficient to state that when the operation of the machine is initiated and rolls 10 and 11 are rotated by the driving mechanism (not shown), filament 16 of dielectric material is drawn from spool 17 and is brought into superimposed position with respect to layers 12 and 14. In the left hand position of switch 37, the high frequency field will be established between rolls 10 and 34, causing preheating of the filament immediately before the said filament enters the bight of pressure rolls 10 and 11. Thus, the successive preheated portions of filament 16 are pressed against the underlying thermoplastic layers 12 and 14 before their temperature is reduced by radiation, or heat losses due to other factors. In the right hand position of switch 37, roll 34 merely serves as a guide roll and the high frequency field is established between the pressure rolls 10 and 11 themselves, thus rendering the preheating step practically coincidental with the pressure-applying step. In the latter case, it is desirable to form the filament 16 of a relatively high-loss dielectric material, such as of a suitable vinyl resin, and to form the layers to be bonded together from relatively low-loss thermoplastic dielectric material, such as polyethylene. This will assure that most of the dielectric losses will be produced in the filament itself whereas the heating of the underlying layers to be bonded together will be the result of heat transfer between the preheated filament and the layers, rather than the direct result of dielectric losses in the layers.

It will be noted that the principles of the present invention provide numerous advantages, the most important of which are the following:

(1) Since the sealing heat is generated in a filamentary member of greatly reduced cross section, rather than in the thermoplastic layers themselves, the high frequency power requirements are a mere fraction of those of conventional electronic bonding machines.

(2) The control of the sealing heat is greatly facilitated and the quality and strength of the resulting bond is not markedly influenced by small variations in the thickness of the layers to be bonded. Good bonds may be obtained even when the number of layers or plies is different along different portions of the linear seam.

(3) The problem of impedance matching between the high frequency generator and the heating coil or electrodes is greatly simplified.

(4) When the material of the filament remains the same, the adjustment of the high frequency circuit is not appreciably affected by a change in the material or in the thickness of the layers to be bonded, provided that the amount of heat stored in the filament during the preheating step is adequate for bringing the underlying layers to their bonding temperature.

(5) The invention makes it possible to readily seal thermoplastic layers of a material in which the dielectric losses are extremely low, such as polyethylene. As is known, heretofore it was not possible to seal such thermoplastic materials by means of conventional electronic bonding machines.

(6) The invention permits the sealing of thermoplastic layers of very low thickness. Such thin layers could not be bonded with conventional machines due to the extremely critical adjustment of the high frequency power output which would frequently cause burning or destruction of the thin layers without producing an adequate bond.

Although the present invention has been described in connection with a few preferred embodiments thereof, variations and modifications may be resorted to by those skilled in the art without departing from the principles of the invention. I consider all of these variations and modifications to be within the true spirit and scope of my invention, as disclosed in the foregoing description and defined by the appended claims.

What is claimed is:

1. The method of heat sealing layers of thermoplastic material which comprises bringing regions of the layers to be heat sealed into face-to-face superposed position, preheating an elongated member to heat sealing temperature in the absence of contact with the layers to be sealed, and pressing said preheated member against said regions of the layers to cause heating and bonding of said member and of said layers in such regions.

2. The method of heat sealing layers of thermoplastic material which comprises bringing regions of the layers to be heat sealed into face-to-face superposed position, progressively preheating successive portions of an elongated member to heat sealing temperature in the absence of contact with the layers to be sealed, and progressively pressing the preheated portions of said member against said regions of the layers to cause heating and bonding of said member and of said layers in a linear seam.

3. The method of heat sealing layers of thermoplastic material which comprises progressively preheating successive portions of an elongated filamentary member to heat sealing temperature in the absence of contact with the layers to be sealed, and progressively pressing such preheated portions of said member against said layers to cause heating and bonding of said member and of said layers in a corresponding linear region.

4. The method of heat sealing layers of thermoplastic material which comprises progressively passing a filamentary member through a heating zone to preheat said member to a temperature at least equaling the bonding temperature of the layers in the absence of contact with such layers, and progressively pressing preheated portions of the member against said layers to cause permanent bonding of said member and of the underlying layers into a single heat sealed structure in a corresponding linear region.

5. The method of heat sealing layers of thermoplastic material which comprises progressively passing a filament through a heating zone to preheat said filament to a temperature not lower than the bonding temperature of the layers, and progressively pressing preheated portions of the filament against said layers to cause permanent bonding of said filament and of the underlying layers into a single heat sealed structure in which said filament is at least partially embedded.

6. The method of heat sealing layers of thermoplastic material which comprises first progressively passing a filament through a high frequency field to cause preheating of successive portions of the filament to heat sealing temperature, and thereafter progressively pressing such preheated portions of the filament against said layers to cause bonding of said layers in a linear region in correspondence with the region of pressure in which said filament is at least partially embedded.

7. The method of heat sealing layers of thermoplastic material which comprises progressively passing an electrically conducting filament through a high frequency field to cause preheating of successive portions of the filament to heat sealing temperature, and progressively pressing such preheated portions of the filament against said layers to cause bonding of said layers in a corresponding linear region in which said filament is at least partially embedded.

8. The method of heat sealing layers of thermoplastic material which comprises progressively passing a filament of dielectric material through a high frequency field to cause preheating of successive portions of the filament to heat sealing temperature, and progressively pressing such preheated portions of the filament against said layers to cause bonding of said layers in a corresponding linear region in which said filament is at least partially embedded.

9. The method of heat sealing layers of thermoplastic material which comprises progressively passing a filamentary member through a high frequency field to cause preheating of successive portions thereof to heat sealing temperature, and then progressively advancing such preheated portion of said member together with the superimposed layers of said thermoplastic material through the bight of a pair of pressure rolls thereby to cause permanent bonding of said member and of said layers in a corresponding linear region in which said filamentary member is at least partially embedded.

10. The method of heat sealing layers of thermoplastic material which comprises progressively passing a filamentary member of dielectric material through the bight of a pair of electrode rolls between which a high frequency field is maintained to preheat successive portions thereof to heat sealing temperature, and immediately thereafter progressively advancing such preheated portion of said member together with layers of said thermoplastic material through the bight of a pair of pressure rolls thereby to cause permanent bonding of said member and of said layers in a corresponding linear region in which said filamentary member is at least partially embedded.

11. The method of heat sealing which comprises progressively superposing onto layers of relatively low-loss dielectric thermoplastic material a filament of relatively high-loss dielectric material to constitute a composite structure, continuously advancing said structure through a high frequency field thereby to raise the temperature of said filament to a temperature not lower than the bonding temperature of the layers, and progressively advancing said preheated structure through a pressure zone thereby to cause transfer of sealing heat from said filament onto the layers in contact therewith and permanent bonding of said filament and of the underlying layers in a corresponding linear region in which said filament is at least partially embedded.

NICHOLAS LANGER.

References Cited in the file of this patent

UNITED STATES PATENTS

| Number | Name | Date |
| --- | --- | --- |
| 2,570,921 | Collins | Oct. 9, 1951 |